(12) United States Patent
Izzo et al.

(10) Patent No.: US 6,183,222 B1
(45) Date of Patent: Feb. 6, 2001

(54) ELECTRIC FAN ASSEMBLY FOR VEHICLE AIR CONDITIONING SYSTEMS

(75) Inventors: Antonio Izzo, Fossano; Cesario Marchesani, Vasto, both of (IT)

(73) Assignee: Magneti Marelli Climatizzazione S.p.A., Turin (IT)

( * ) Notice: Under 35 U.S.C. 154(b), the term of this patent shall be extended for 0 days.

(21) Appl. No.: 09/223,726

(22) Filed: Dec. 31, 1998

(30) Foreign Application Priority Data

Jan. 12, 1998 (IT) .............................................. TO98A0016

(51) Int. Cl.[7] .............................. F04B 17/00; F04B 35/04
(52) U.S. Cl. ...................... 417/423.14; 439/153; 439/351
(58) Field of Search ........................... 417/423.14, 410.1, 417/424.2; 439/153, 352, 353, 723, 923, 248, 930

(56) References Cited

U.S. PATENT DOCUMENTS 4,160,576 * 7/1979 Vettori ................................. 439/191

* cited by examiner

Primary Examiner—Teresa Walberg
Assistant Examiner—Thor Campbell
(74) Attorney, Agent, or Firm—Sughrue, Mion, Zinn, Macpeak & Seas, PLLC

(57) ABSTRACT

An electric fan assembly for vehicle air conditioning systems is described including an electric motor carrying an impeller and a casing having a section for conveying a stream of air and a seat for housing the electric motor. The assembly includes an electric connector having a first section fixed to the electric motor and co-operating with a connector-carrying seat formed integrally in the housing seat provided on the casing for receiving a second connector section.

12 Claims, 4 Drawing Sheets

ELECTRIC FAN ASSEMBLY FOR VEHICLE AIR CONDITIONING SYSTEMS

BACKGROUND OF THE INVENTION

The present invention concerns an electric fan assembly for vehicle air conditioning systems, of the type defined in the preamble to the main claim.

These electric fan assemblies are conventionally constituted by an actual electric fan comprising an electric motor and a fan impeller fitted to the rotating shaft of the aforesaid motor, and a casing therefor which is usually made from plastics material.

The casing is intended to contain and protect the various parts of the electric motor and fan; the part of the casing which surrounds the impeller, commonly known as a collector scroll cowling, is formed so as to convey the air stream produced towards distribution ducts.

In the known arrangements, the electric motor is connected to an electric power supply by means of a connector comprising a first section formed integrally with the casing and a second section connected to an electrical supply cable and cooperating with the first section in a coupling configuration.

While assembling the electric motor on the assembly, it is necessary to connect the motor electrically to the first section of the connector.

The main problem of the arrangements known until now is that this connection is complex due to the necessity of operating in a poorly-accessible place, and is subject to polarity inversion errors.

A further disadvantage of this arrangement is that, once mounted, the connecting wires between the brushes and the connector are too long and can prevent the apparatus operating correctly.

SUMMARY OF THE INVENTION

The object of the invention is to avoid these disadvantages by simplifying the operations for mounting the electric motor in the casing, at the same time reducing costs and time, and to improve the reliability of the entire electric fan assembly.

According to the invention, these objects are achieved by an electric fan assembly for vehicle air conditioning system. The arrangement according to the invention consists in forming the entire connector separately from the casing, in particular by connecting the wire terminals of the brushes of the electric motor to the first section of the connector body without using long connecting wires, and providing this latter with means for the direct snap-engagement on to the brush-holder assembly of the electric motor itself.

This pre-assembled unit can thus easily be inserted into a housing provided in the casing until the first connector section faces its own seat formed integrally with the casing itself. The engagement of a second connector section through the seat also prevents the axial sliding of the electric fan with respect to the casing.

BRIEF DESCRIPTION OF THE DRAWINGS

Further characteristics and advantages of the invention will be explained in more detail in the following description of an embodiment, given purely by way of non-limitative example, with reference to the accompanying drawings in which.

DETAILED DESCRIPTION OF THE PREFERRED EMBODIMENTS

Figure 1:
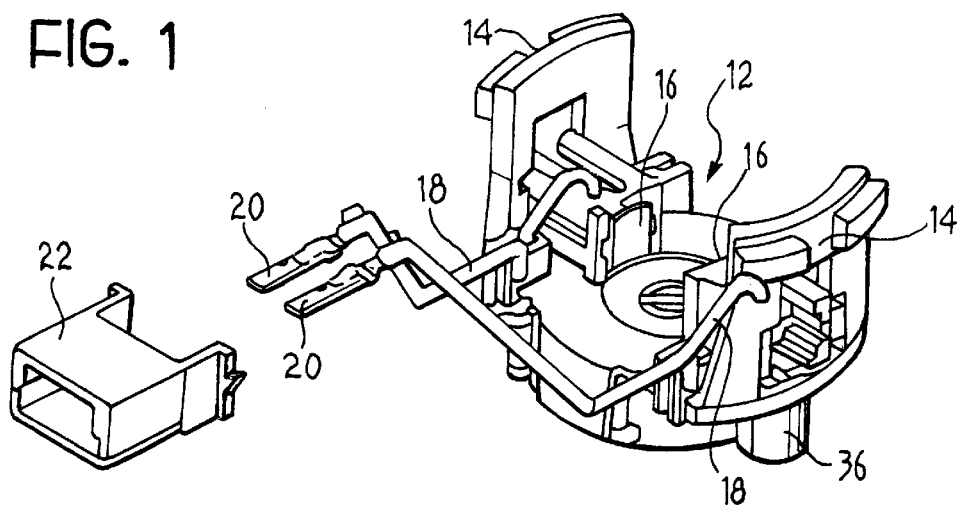
FIG. 1 is an exploded perspective view of some parts of the electric fan assembly according to the invention concerning, in particular, the electric connector assembling.
Figure 1:
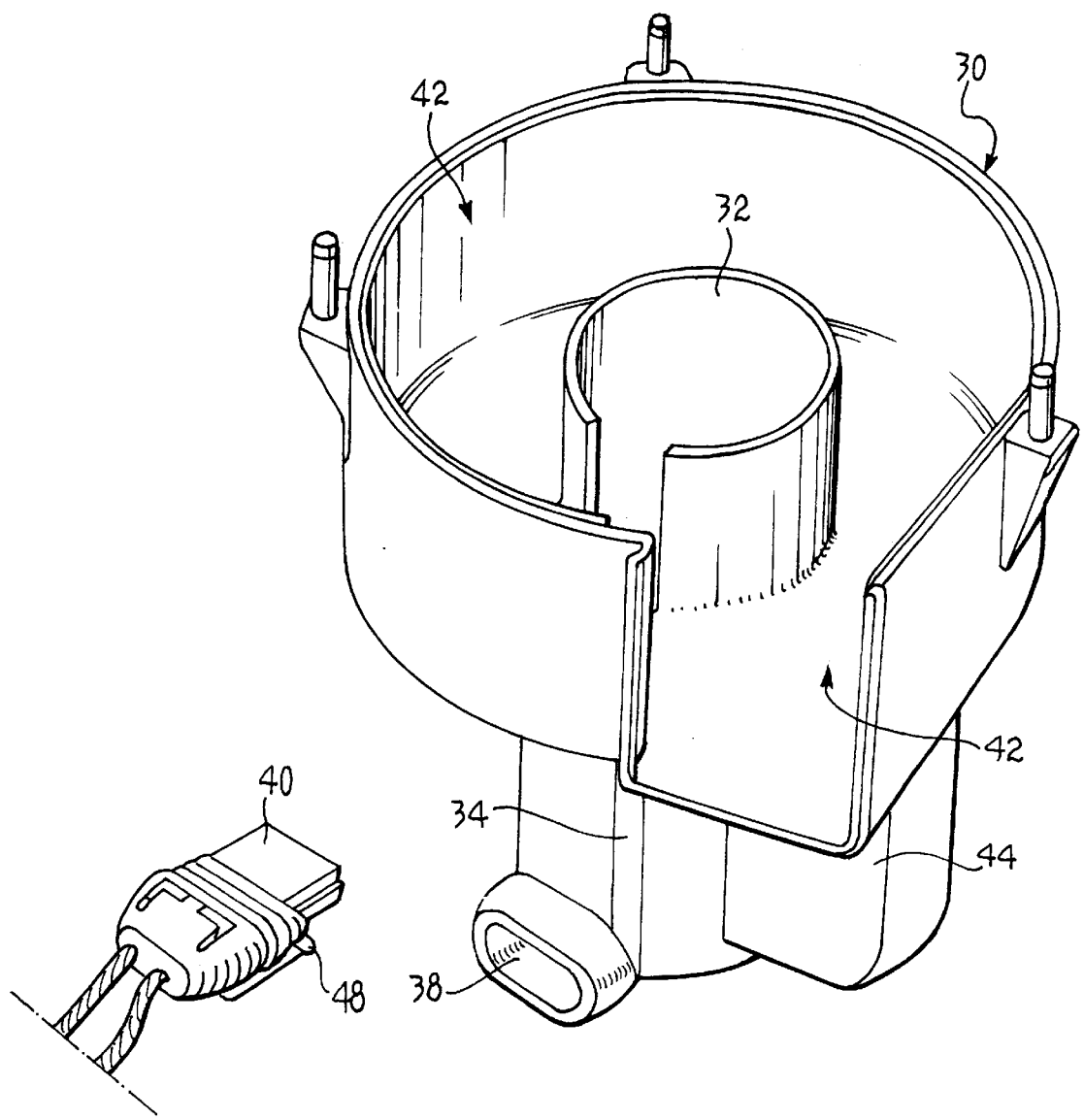
Figure 3:
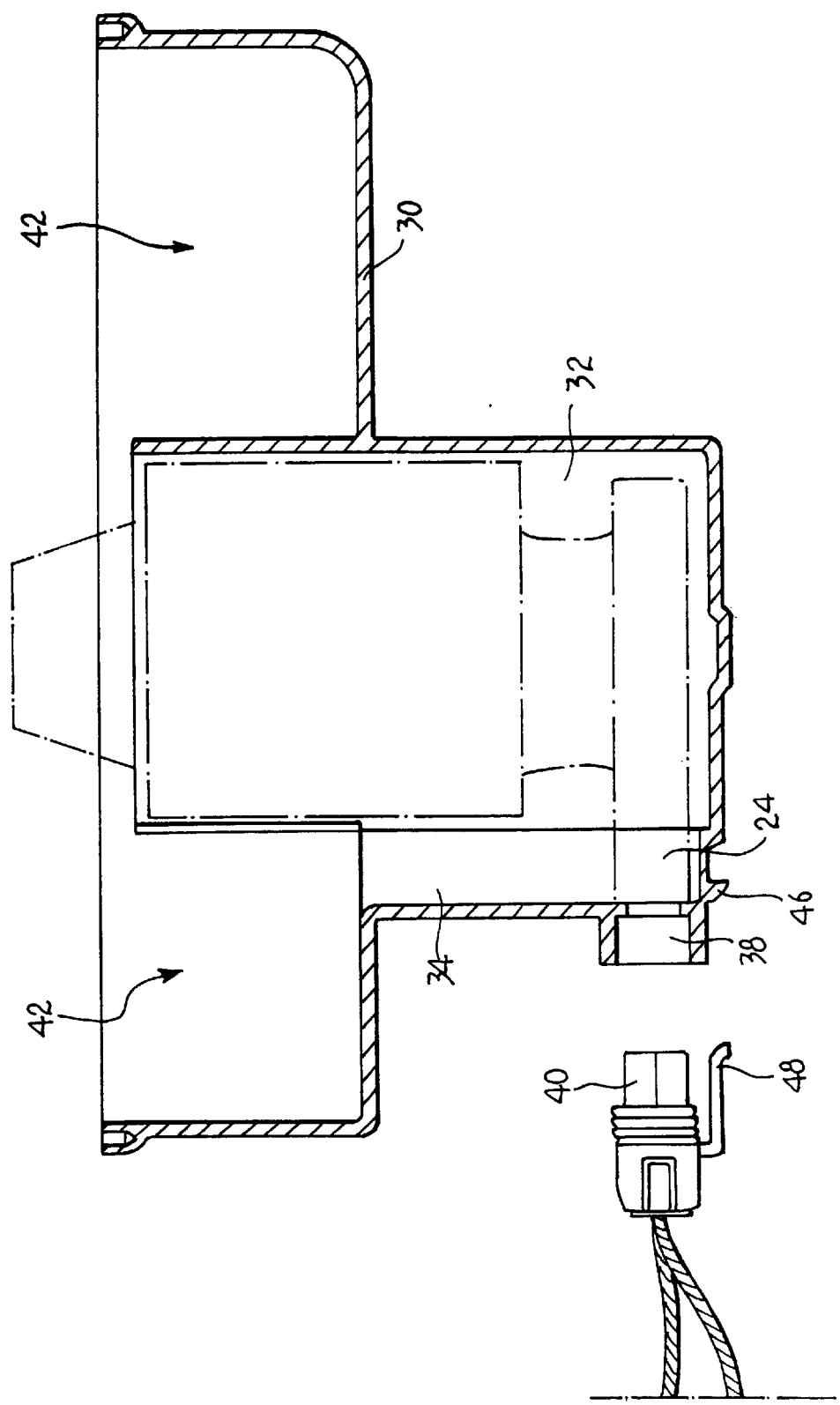
FIG. 3 is a view in section of the whole electric fan assembly.
Figure 4:
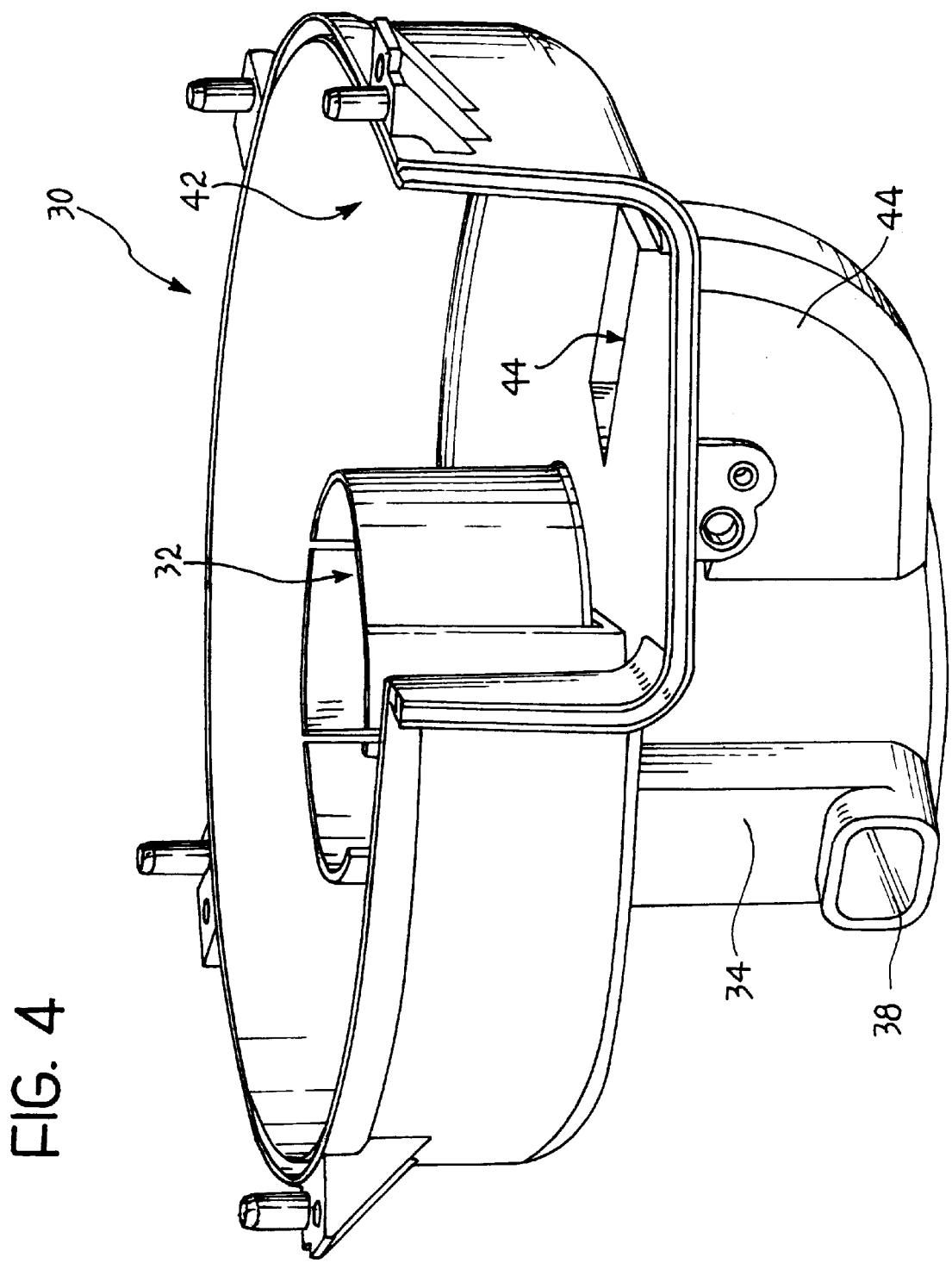
FIG. 4 is a perspective view of the casing of the electric fan assembly.

With reference to FIGS. 1, 3 and 4, the components involved in mounting the connector on board the electric motor are described in detail.

Of this latter, only the brush-holder base 12 which is mounted fixed to the stator by predisposed couplings 14 is shown. The opposite-facing brushes 16 are also shown, while the commutator is not shown so as to avoid further complicating the drawing.

Braids 18 of electric wire are formed to the rear of the brushes 16, to the ends of which braids are attached the wire terminals 20 to constitute the electrical terminals of the motor.

The wire terminals 20 are intended to be inserted and snap-engaged in corresponding pits formed integrally in a body 22 of the connector which is shown as a female joint in this particular representation, to form a first section 24 of the electrical connector.

Figure 2:
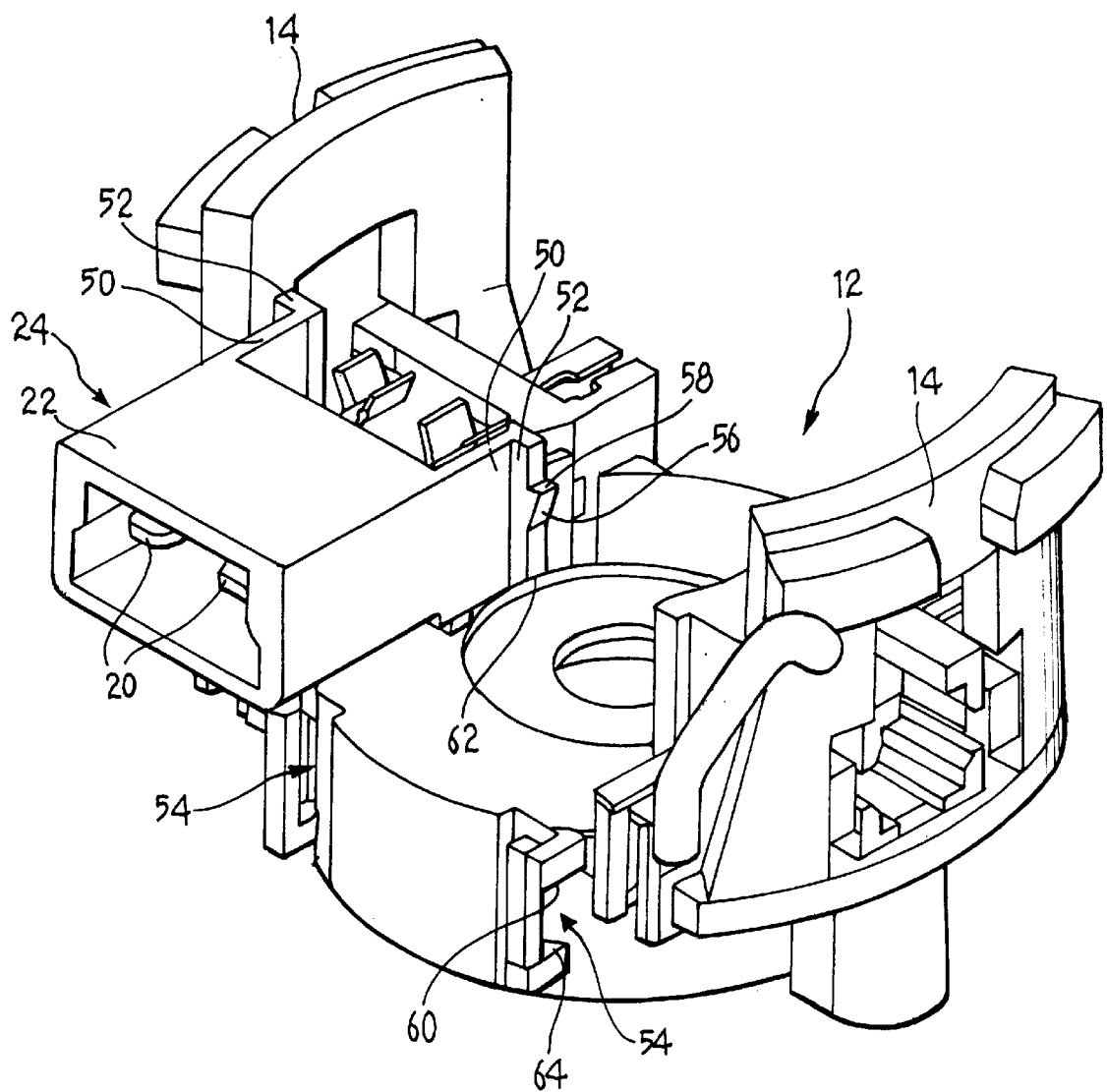
FIG. 2 is a perspective view on an enlarged scale of the connector section according to the invention in engagement with the brush holder base of the electric motor.

Once the first connector section 24 has been formed, it is mounted directly on the electric motor as will become clear below in the description given with reference to FIG. 2.

The electric fan provided with the first connector section is housed in a plastics casing 30 formed by injection moulding.

The electric motor is housed down in a substantially cylindrical seat 32 formed integrally in the casing and adapted to contain the motor. A guide channel 34 is provided in a wall portion to enable the axial sliding of the first connector section 24 pre-assembled on the electric motor. The entire electric fan is fixed to the casing 30 by means of self-tapping screws screwed into suitable holes formed on the turrets 36.

Once the electric motor has been inserted, the first connector section 24 is aligned with a connector-carrying seat 38, this also being formed integrally in the casing (as is seen more clearly in FIG. 3) so that it can receive a second connector section 40 outside the electric fan assembly.

Once assembled, the fan impeller (not shown here) is located in correspondence with an air stream collector scroll cowling 42 (which, in FIG. 1, is indicated only in part, the entire upper part of the casing being omitted). The collector scroll cowling 42 and the seat 32 of the electric motor communicate with each other by means of a secondary duct 44 provided to ensure the electric motor is cooled using the air stream produced by the fan impeller.

The second connector section 40 which supplies the electric motor and which, in this case, has been shown as a male joint, is thus inserted through the seat 38 into the corresponding first section 24 formed by the female joint 22 and the wire terminals 20, and thus also contributes to the axial locking of the electric fan with respect to its casing 30. The two connector sections are fixed together by means of a tooth 46 formed outside the connector-carrying seat 38, which snap-engages with a resiliently flexible flange 48 provided on the second connector section 40.

As mentioned above, the details of the coupling means which enable the anchorage of the first connector section 24 to the electric motor and, in particular, to the brush-holder base 12, will now be described below.

The body 22 of the first connector section 24 is provided with a pair of opposing tongues 50 projecting from the end facing towards the electric motor, a pair of outwardly-facing transverse projections 52 being formed integrally at the end of these tongues. This pair of projections 52 engages with a corresponding pair of guides 54 formed integrally on the base of the brush-holder, sliding therein in an axially-downward movement, assuming the position shown in FIG. 2 as a reference orientation.

The axial locking of the connector section 24 occurs by virtue of a pair of teeth 56 formed on the pair of projections 52, which has an associated first pair of abutment faces 58 capable of snap-engaging with a corresponding second pair of abutment surfaces 60 formed to the side of the brush-holder guide pair 54.

Movement along the same axis, but in the opposite direction, is prevented by the contact between a third pair of abutment surfaces 62 which are also the lower ends of the pair of projections 52, and a fourth pair of abutment surfaces 64 formed at the lower end of the guide pair 54.

What is claimed is:

1. An electric fan assembly for vehicle air conditioning systems comprising:
    an electric motor having a rotating shaft;
    an impeller fitted to the shaft;
    a casing including a section for conveying an air stream produced by the impeller and including a seat for housing the electric motor; and
    an electric connector including first and second sections cooperating with each other in a coupling configuration in which the first section is electrically connected to the electric motor and the second section is connected to an electric supply cable;
    wherein the first section of the connector is fixed to the electric motor and cooperates with a connector-carrying seat formed integrally in the electric motor housing seat, the connector-carrying seat provided on a periphery of the casing for receiving the second connector section.

2. An electric fan assembly according to claim 1, wherein the first section of the connector includes a body and at least one pair of electric terminals housed within the body.

3. An electric fan assembly according to claim 2, wherein the body of the first section of the connector includes integral coupling means for snap-engagement to the electric motor.

4. An electric fan assembly according to claim 3, wherein the coupling means include a pair of tongues formed at one end of the body of the first connector section and provided with a pair of transverse projections.

5. An electric fan assembly according to claim 4, wherein the pair of transverse projections is intended to slide axially in a corresponding pair of guides formed on a brush-holder base of the electric motor.

6. An electric fan assembly according to claim 5, wherein the pair of projections has at least one associated pair of teeth having first abutment surfaces capable of coupling with corresponding second abutment surfaces on the pair of guides.

7. An electric fan assembly according to claim 6, wherein the pair of projections further has third abutment surfaces at one end, capable of coupling with corresponding fourth abutment surfaces on the pair of guides.

8. An electric fan assembly according to claim 2, wherein the pair of electric terminals is inserted and snap-engaged in corresponding pits formed integrally in the connector body.

9. An electric fan assembly according to claim 8, wherein the pair of electric terminals is connected by means of electric braids to respective brushes of the electric motor.

10. An electric fan assembly according to claim 1, wherein the seat for housing the electric motor is substantially cylindrical in shape with its longitudinal axis coincident with the shaft of the motor when mounted in the electric motor housing seat.

11. An electric fan assembly according to claim 10, wherein the housing seat also has a guide channel in correspondence with a wall portion, capable of enabling the axial sliding of the first connector section fixed to the electric motor when this latter is mounted in the electric motor housing seat.

12. An electric fan assembly according to claim 11, wherein the connector-carrying seat projects outwardly at one end of the guide channel and has a retaining element intended to engage a corresponding flange formed integrally on the second connector section.

* * * * *